(12) United States Patent
Salama

(10) Patent No.: US 8,418,337 B2
(45) Date of Patent: Apr. 16, 2013

(54) DRY FIBER WRAPPED PIPE

(75) Inventor: Mamdouh M. Salama, Richmond, TX (US)

(73) Assignee: ConocoPhillips Company, Houston, TX (US)

( * ) Notice: Subject to any disclaimer, the term of this patent is extended or adjusted under 35 U.S.C. 154(b) by 1176 days.

(21) Appl. No.: 11/467,948

(22) Filed: Aug. 29, 2006

(65) Prior Publication Data

US 2008/0053554 A1    Mar. 6, 2008

(51) Int. Cl.
  *B22D 19/10* (2006.01)
  *B23K 9/04* (2006.01)
  *B23P 6/00* (2006.01)

(52) U.S. Cl.
  USPC ....... 29/402.18; 29/527.2; 156/169; 156/187; 156/279; 138/99; 138/172

(58) Field of Classification Search ............... 29/402.09, 29/402.18, 458, 527.1, 527.2; 156/279, 166, 156/169, 172, 184, 187; 138/97, 98, 99, 138/131, 172, 177, DIG. 2
See application file for complete search history.

(56) References Cited

U.S. PATENT DOCUMENTS

| | | | |
|---|---|---|---|
| 3,474,834 A | 10/1969 | Carey | |
| 4,558,971 A | 12/1985 | David | |
| 4,559,974 A * | 12/1985 | Fawley | 138/172 |
| 4,606,953 A | 8/1986 | Suzuki et al. | |
| 4,676,276 A * | 6/1987 | Fawley | 138/172 |
| 4,728,224 A | 3/1988 | Salama et al. | |
| 4,849,150 A * | 7/1989 | Kittaka et al. | 264/258 |
| 5,131,583 A | 7/1992 | Matsumoto | |
| 5,363,929 A * | 11/1994 | Williams et al. | 175/107 |
| 5,632,307 A | 5/1997 | Fawley et al. | |
| 5,677,046 A | 10/1997 | Fawley et al. | |
| 5,683,530 A | 11/1997 | Fawley et al. | |
| 5,921,285 A | 7/1999 | Quigley et al. | |
| 5,928,736 A | 7/1999 | Parekh | |
| 6,146,482 A | 11/2000 | Patton et al. | |

(Continued)

FOREIGN PATENT DOCUMENTS

| | | |
|---|---|---|
| EP | 0063469 A1 | 10/1982 |
| EP | 1571438 A1 | 9/2005 |

(Continued)

OTHER PUBLICATIONS

Foreign communication from a related counterpart application—International Search Report and Written Opinion, PCT/US2007/072141, Dec. 11, 2007, 15 pages.

(Continued)

*Primary Examiner* — Jermie Cozart
*Assistant Examiner* — Christopher Koehler
(74) *Attorney, Agent, or Firm* — ConocoPhillips Company

(57) ABSTRACT

A reinforced pipe section comprises a metal pipe, a layer of dry fibers disposed around the metal pipe, and an external liner covering the layer of dry fibers. A method of manufacturing a reinforced pipe section comprises wrapping a layer of dry fibers over a metal pipe, and covering the layer of dry fibers with an external liner, thereby forming a first dry fiber wrapped metal pipe. A method of reinforcing a degraded metal pipe comprises wrapping the degraded metal pipe with a layer of dry fibers to increase the hoop strength of the degraded metal pipe, and covering the layer of dry fibers with an external liner.

23 Claims, 7 Drawing Sheets

U.S. PATENT DOCUMENTS

| | | | |
|---|---|---|---|
| 6,354,334 | B1 | 3/2002 | Ellyin et al. |
| 6,435,218 | B2 | 8/2002 | Hillenbrand et al. |
| 7,534,321 | B2* | 5/2009 | Fawley ............... 156/304.1 |
| 2002/0056511 | A1 | 5/2002 | Mathew et al. |
| 2003/0024587 | A1 | 2/2003 | Guesnon et al. |
| 2003/0209312 | A1* | 11/2003 | Hauber ............... 156/172 |
| 2004/0086341 | A1 | 5/2004 | Salama et al. |
| 2005/0067037 | A1 | 3/2005 | Salama |
| 2006/0049195 | A1 | 3/2006 | Koussios et al. |
| 2006/0118191 | A1* | 6/2006 | Rice ............... 138/99 |

FOREIGN PATENT DOCUMENTS

| | | |
|---|---|---|
| JP | 62258089 | 11/1987 |
| JP | 631658 | 4/1994 |
| JP | 71037 | 1/1995 |
| JP | 2001289366 | 10/2001 |
| JP | 2002273805 | 9/2002 |
| JP | 2003028347 | 1/2003 |
| JP | 2006118656 | 5/2006 |
| WO | WO 96/33238 | 10/1996 |
| WO | WO 98/50725 | 11/1998 |
| WO | 0162477 A2 | 8/2001 |
| WO | WO 03/089226 A1 | 10/2003 |
| WO | WO 2005/044541 A1 | 5/2005 |

OTHER PUBLICATIONS

Fairchild, et al., "Girth Welding Development for X120 Linepipe," Proceedings of the Thirteenth (2003) International Offshore and Polar Engineering Conference, Honolulu, Hawaii, May 25-30, 2003, pp. 26-35 (10 pgs.).

Judah, et al., "Action: Request for Interpretation of Section 192. 455(a) Relative to the Use of Metallic Sleeve Crack Arrestors on Large Diameter Pipelines," Jul. 9, 1981 (3 pgs.).

Koo, et al., "Metallurgical Design of Ultra-High Strength Steels for Gas Pipelines," Proceedings of the Thirteenth (2003) International Offshore and Polar Engineering Conference, Honolulu, Hawaii, May 25-30, 2003, pp. 10-18 (9 pgs.).

Okaguchi, et al, "Development and Mechanical Properties of X120 Linepipe," Proceedings of the Thirteenth (2003) International Offshore and Polar Engineering Conference, Honolulu, Hawaii, May 25-30, 2003, pp. 36-42 (7 pgs.).

Papka, et al., "Full-Size Testing and Analysis of X120 Linepipe," Proceedings of the Thirteenth (2003) International Offshore and Polar Engineering Conference, Honolulu, Hawaii, May 25-30, 2003, pp. 50-59 (10 pgs.).

"Composite-reinforced line pipe passes Canadian field tests," Oil & Gas Journal, Nov. 3, 2003, pp. 64, 66, 67 (3 pgs.).

"Introduction to Spoolable Reinforced Composites," Future Pipe Industries, available at www.futurepipe.com/downloads/usa/srcdownload7.pdf, Jan. 2005, pp. 1-4 (4 pgs.).

"X times stronger—BP's research into high-strength steel materials for building large onshore pipelines has provided the industry with a new and cost effective alternative to conventional pipeline construction. Malcolm Brown reports on the impressive strength of X100," Frontiers Magazine, Aug. 2004, pp. 24-27 (4 pgs.).

About Flexpipe, available at www.flexpipesystems.com/about.html, printed on Mar. 13, 2007 (1 pg.).

What'S New, available at www.flexpipesystems.com/whatsnew.html, dated Jan. 2007 and printed on Mar. 13, 2007 (1 pg.).

Manufacturing, available at www.flexpipesystems.com/manufacturing.html, printed on Mar. 13, 2007 (1 pg.).

Product Data, available at www.flexplpesystems.com/prodata.html, printed on Mar. 13, 2007 (6 pgs.).

Fast & Easy Product Data FP300 & FP150, available at www.flexpipesystems.com, printed on Mar. 13, 2007 (2 pgs.).

Flexpipe Product Data Printable, available at www.flexpipesystems.com/prodprint.htm, printed on Mar. 13, 2007 (4 pgs.).

Joining System, available at www.flexpipesystems.com/joinsys.html, printed on Mar. 13, 2007 (2 pgs.).

Installation, available at www.flexpipesystems.com/install.html, printed on Mar. 13, 2007 (2 pgs.).

Service, available at www.flexplpesystems.com/service.html, printed on Mar. 13, 2007 (1 pg.).

F.A.Q., available at www.flexplpesystems.com/faq.html, printed on Mar. 13, 2007 (3 pgs.).

Japanese Patent Office, Office Communication for JP application No. 2009-526783, dispatch date Feb. 14, 2012.

* cited by examiner

DRY FIBER WRAPPED PIPE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates generally to reinforced metal pipe sections comprising dry fiber wrapped metal pipes for use in high-pressure fluid transport applications, and methods for manufacturing reinforced pipe sections of this type.

BACKGROUND

As the worldwide demand for natural gas grows, the need to develop remotely located sources of natural gas becomes increasingly more important. Often, however, the high cost of building the infrastructure necessary to deliver natural gas from such remote locations negates the financial incentives to develop these sources. Thus, there is a need to reduce the costs associated with constructing facilities such as pipelines to deliver natural gas to market.

In recent years, several major oil and gas companies have invested significant resources into developing high strength steels for use in large diameter natural gas pipelines, such as pipelines ranging from 36-inches to 54-inches in diameter. A shorthand terminology has been developed by American Petroleum Institute (API) Specification 5L to designate grades of line pipe steel using the letter "X" followed by a number corresponding to its minimum yield strength. For example, X100 steel has a minimum yield strength of 100,000 pounds per square inch (psi), and similarly, X120 steel has a minimum yield strength of 120,000 psi. Generally, grade X70 or lower is considered "conventional strength steel", whereas grades above X70 are considered "high strength steel", typically beginning at grade X80.

High strength steel has a relatively low crack resistance, so if a pipe were to become damaged and a crack were to form, that crack may propagate along the pipeline for many miles. To prevent these running cracks, crack arrestors may be placed at locations along the pipeline, for example, every two to four miles. A crack arrestor may comprise a welded steel ring or a bonded composite ring disposed around the outer surface of a pipe. Representative composite crack arrestors are manufactured and sold by Clock Spring Company, L.P. of Houston Tex. In addition, high strength steel manufacturing capacity is low, welding of high strength steel is complicated, and high strength steels have a lower plastic strain capacity than conventional steels, which may limit their use in applications requiring a high plastic strain capacity, such as pipelines installed in permafrost and seismic areas, for example.

Thus, to develop remotely located sources of natural gas, a need exists for an economical means to deliver such gas to market.

SUMMARY OF THE INVENTION

The present invention relates to a reinforced pipe section comprising a metal pipe, a layer of dry fibers disposed around the metal pipe, and an external liner covering the layer of dry fibers. In an embodiment, the layer of dry fibers increases the hoop strength of the metal pipe. In other embodiments, the metal pipe is comprised of conventional steel pipe having a yield strength of approximately 70,000 psi (X70) or less, or high strength steel pipe having a minimum yield strength of greater than 70,000 psi. The metal pipe may comprise a corrosion resistant alloy. In an embodiment, the metal pipe arrests a crack that may develop during service. The metal pipe may comprise bare pipe or coated pipe, wherein the metal pipe may be pre-coated with an organic coating or with an anodic metallic coating. In other embodiments, the metal pipe is corrosion protected by an aluminum anode strip wound onto the metal pipe, or by a pH spiking salt applied to the layer of dry fibers. In another embodiment, the metal pipe comprises a degraded pipe.

The dry fibers may be selected from the group consisting of: glass fibers, carbon fibers, high density polyethylene fibers, or amid fibers, and the layer of dry fibers may comprise a ribbon of multiple parallel strands with each strand consisting of many continuous filaments. The external liner may comprise a sprayed-on or a wrapped on liner. In an embodiment, the external line comprises an elastomeric liner that comprises polyurea, polyurethane, or HNBR rubber. In another embodiment, the external liner comprises a welded metal wrapping formed around the dry fibers. In yet another embodiment, the external liner forms a moisture barrier.

The metal pipe may comprise a wall thickness sufficient to withstand the axial loads imposed during service. In an embodiment, the layer of dry fibers has a thickness substantially equal to the wall thickness of the metal pipe, and the layer of dry fibers may approximately double the hoop strength of the metal pipe. The metal pipe may have a nominal diameter in the range of 64-inches or less. In an embodiment, the reinforced pipe further comprises an insulating layer. In various embodiments, a gas pipeline, a liquid pipeline, a riser, or a choke and kill line comprises the reinforced pipe section.

In another aspect, the present invention relates to a method of manufacturing a reinforced pipe section comprising wrapping a layer of dry fibers over a metal pipe, and covering the layer of dry fibers with an external liner, thereby forming a first dry fiber wrapped metal pipe. In an embodiment, wrapping the layer of dry fibers comprises hoop winding a plurality of dry fibers around the metal pipe. In various embodiments, covering the layer of dry fibers with an external liner comprises spraying on a coating or wrapping on a liner. In yet another embodiment, the method includes wrapping a layer of insulating material over the layer of dry fibers. The method may further comprise positioning a second dry fiber wrapped metal pipe adjacent to the first dry fiber wrapped metal pipe, connecting the second dry fiber wrapped metal pipe to the first dry fiber wrapped metal pipe via a weld, wrapping the weld with a layer of dry fibers, and creating an external liner over the layer of dry fibers disposed around the weld, thereby forming a dry fiber wrapped weld area. In an embodiment, the first and second dry fiber wrapped metal pipes are formed in a manufacturing facility and the dry fiber wrapped weld area is formed at a field location.

In yet another aspect, the present invention relates to a method of reinforcing a degraded metal pipe comprising wrapping the degraded metal pipe with a layer of dry fibers to increase the hoop strength of the degraded metal pipe, and covering the layer of dry fibers with an external liner.

BRIEF DESCRIPTION OF THE DRAWINGS

For a more detailed description of the present invention, reference will now be made to the accompanying drawings, wherein.

NOTATION AND NOMENCLATURE

Figure 1:
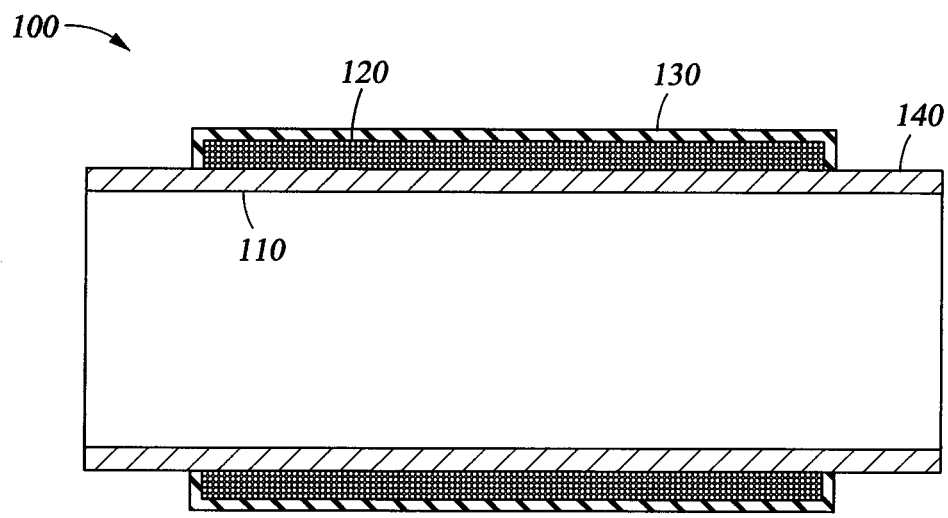
FIG. 1 is an enlarged cross-sectional side view of a dry fiber wrapped metal pipe.

Certain terms are used throughout the following description and claims to refer to particular assembly components. This document does not intend to distinguish between components that differ in name but not function. In the following discussion and in the claims, the terms "including" and "comprising" are used in an open-ended fashion, and thus should be interpreted to mean "including, but not limited to . . . ".

As used herein, the term "pipe" refers to any tubular that carries pressurized gasses or liquids, such as a pipeline, a riser, a flow line, and a choke and kill line, for example.

As used herein, the terms "pressure capacity", "pressure rating", and "hoop strength" of a pipe all refer to the amount of internal pressure, as measured in pounds per square inch (psi), that the pipe is capable of containing without failing in the radial direction by burst.

As used herein, the terms "axial strength" and "axial capacity" of a pipe both refer to the axial load, as measured in psi, that the pipe is capable of withstanding without parting axially.

As used herein, the term "conventional strength steel" refers to a steel having a minimum yield strength of 70,000 psi or less, namely X70 grade or lower grade steel.

As used herein, the term "high strength steel" refers to a steel having a minimum yield strength greater than 70,000 psi, namely greater than X70 grade steel.

As used herein, the term "corrosion resistant alloy" refers to materials containing alloying elements, such as nickel, chromium, titanium, or cobalt. These materials include stainless steels, nickel-based alloys, titanium alloys, and the like. Commonly used grades are austenitic stainless steels such as alloy 316, martensitic stainless steels such as alloy 13 Cr, duplex stainless steels such as alloy 2205, and nickel-based alloys such as alloy 625.

DETAILED DESCRIPTION

Various embodiments of a dry fiber wrapped pipe will now be described with reference to the accompanying drawings, wherein like reference numerals are used for like features throughout the several views. There are shown in the drawings, and herein will be described in detail, specific embodiments of dry fiber wrapped pipe with the understanding that this disclosure is representative only and is not intended to limit the invention to those embodiments illustrated and described herein. The embodiments of dry fiber wrapped pipe and the methods of manufacturing such pipe disclosed herein may be used in any metallic pipeline system that is limited by its pressure rating, whether due to high-pressure gas or liquid. One of ordinary skill in the art will readily appreciate that the various embodiments of dry fiber wrapped pipe may be utilized in any type of pressurized fluid system. Moreover, the methods disclosed herein may be utilized to increase the pressure rating of previously installed pipe that may be a component of a pipeline, riser, choke and kill line, or some other high-pressure system, that has degraded due to corrosion, erosion and/or wear.

Figure 2:
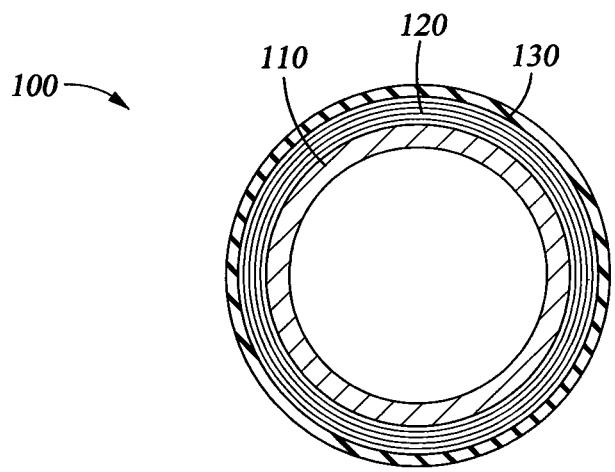
FIG. 2 is an enlarged end view of the dry fiber wrapped metal pipe of FIG. 1.

FIG. 1 and FIG. 2 schematically depict a representative reinforced pipe section 100 in cross-sectional view and in end view, respectively. The reinforced pipe section 100 comprises a metal tubular or pipe 110, a layer of dry fiber 120 hoop-wound over the metal pipe 110, and a sprayed-on external elastomeric liner 130. One skilled in the art will recognized that other material layers may optionally be included in the reinforced pipe section 100, such as a layer of thermal insulation material like areogel, for example.

In one embodiment, the metal pipe 110 may be constructed of a corrosion resistant alloy for transporting corrosive gas or liquids. One such application may be a flow line transporting corrosive wet gas, where such flow lines are typically 8-inches to 14-inches in diameter. For larger diameters, the metal pipe 110 may be constructed of carbon steel pipe that is internally clad with a corrosion resistant alloy. For dry gas applications, the metal liner or pipe 110 may be a typical 40 to 60-foot long pipe joint constructed of conventional strength steel, such as X70, for example, that is 36-inches to 54-inches in diameter. Conventional strength steel is far more desirable than high strength steels because of its ready commercial availability, high crack arrest resistance, high plastic strain capacity and ease of welding. The wall thickness of the metal pipe 110 may vary. In one embodiment, the wall thickness is determined based on the anticipated axial load on the reinforced pipe section 100, and the hoop strength of the reinforced pipe section 100 is established by both the wall thickness of the metal pipe 110 and the thickness of the dry fiber layer 120.

The layer of dry fiber 120 comprises a ribbon of multiple parallel strands with each strand consisting of many continuous filaments, such as a bundle of glass fiber, carbon fiber, high density polyethylene fiber, amid fiber, or other similar material. The purpose of the dry fiber layer 120 is to increase the hoop strength of the reinforced pipe section 100, and therefore its pressure rating. Under a given internal pressure load, the relationship between the hoop stress ($\sigma_s$) and the axial stress ($\sigma_a$) in a bare metal pipe 110 is set out as shown in the following equation:

$$\sigma_s = 2 \times \sigma_a$$

Therefore, if the wall thickness of the metal pipe 110 were selected to satisfy the axial stress ($\sigma_a$) requirement, then the metal pipe 110 would only be able to withstand half the hoop stress ($\sigma_s$) requirement.

This means the ability of a bare metal pipe 110 to withstand the internal pressure load is limited by its hoop strength. Application of a dry fiber layer 120 surrounding the metal pipe 110 can significantly increase the hoop strength, and the pressure rating, of the reinforced pipe section 100. For example, as discussed in the Examples section herein, testing and analysis have shown that the application of a dry fiber layer 120 comprising fiberglass of a thickness approximately equal to the wall thickness of the metal pipe 110 approximately doubles the hoop strength, and therefore the pressure rating, of the reinforced pipe section 100. One skilled in the art may readily appreciate that the thickness of the dry fiber layer 120 may vary depending upon the fiber material used, the wall thickness of the metal pipe 110, the desired pressure rating of the reinforced pipe section 100, and other factors.

An external liner 130 surrounds the dry fiber layer 120 and may comprise an elastomeric liner such as polyurea or polyurethane, a rubber like HNBR rubber, or other similar material. In another embodiment, the external liner 130 may comprise a welded metal wrapping formed around the dry fiber layer 120. The purposes of the external liner 130 are two-fold. First, the dry fiber layer 120 may be loose, such that the external liner 130, when sprayed on or wrapped over the dry fiber layer 120, acts to hold the dry fiber layer 120 together and onto the metal pipe 110. Second, the external liner 130 may act as a moisture barrier to prevent moisture from becoming trapped within the dry fiber layer 120 and eventually causing corrosion along the outer surface of the metal pipe 110. One skilled in the art may readily appreciate that the thickness of the external liner 130 may also vary. In various embodiments, the metal pipe 110 may initially be bare or may be coated for corrosion resistance, such as to resist any moisture that may become trapped in the dry fiber layer 120 should the external liner 130 become damaged. In an embodiment, the metal pipe 110, particularly one made of carbon steel, is pre-coated with an organic coating such as epoxy or special coating gel, or an anodic metallic coating such as aluminum or zinc that is sprayed onto the outer surface of the metal pipe 110. In another embodiment, a carbon steel metal pipe 110 may be corrosion protected by winding an aluminum anode strip onto the metal pipe 110, or by incorporating a pH spiking salt into the dry fiber layer 120 that acts to increase the pH of any water that may ingress around the metal pipe 110, thus reducing the corrosion rate. In still another embodiment, a coating of polyethylene may be extruded onto the outer surface of the metal pipe 110 in a conventional manner.

As shown in FIG. 1, during manufacture of the reinforced pipe section 100, the ends 140 of the metal pipe 110 may remain bare, meaning they are not wrapped with a dry fiber layer 120 nor sprayed with a coating that dries to form an external elastomeric liner 130. During the installation process, adjacent reinforced pipe sections 100 are welded together at these ends 140. Hence, it may be desirable to keep the ends 140 of the metal pipe 110 free from a dry fiber layer 120 and an external elastomeric liner 130 prior to installation to ensure an effective weld.

Figure 3:
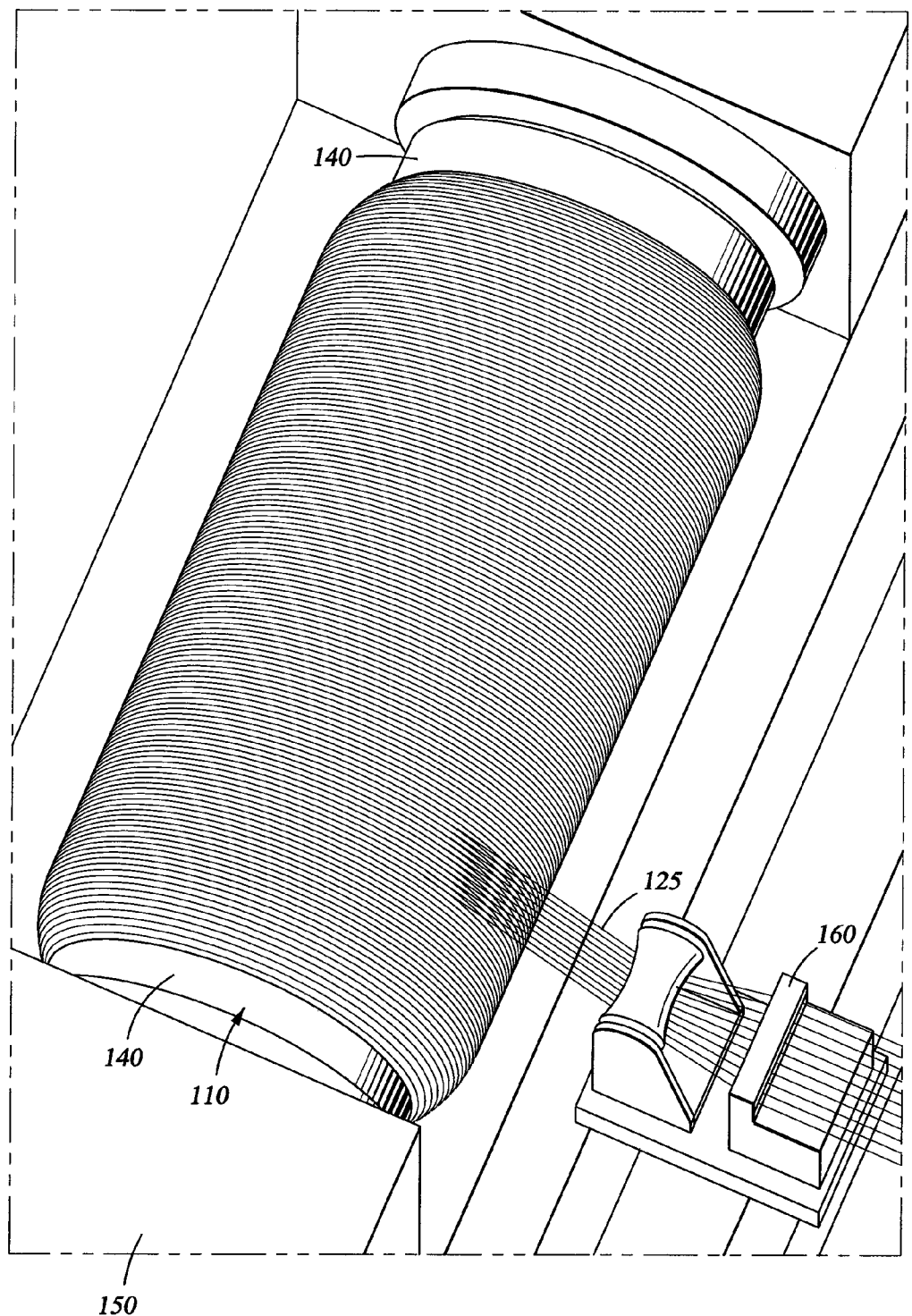
FIG. 3 is a perspective side view of a metal pipe section as it is being wrapped with dry fiberglass fibers.

FIG. 3 through FIG. 7 schematically depict one embodiment of a manufacturing method for the reinforced pipe section 100 of FIG. 1 and FIG. 2. As shown in FIG. 3, the manufacturing method begins with a metal pipe 110, such as a joint of conventional strength steel, being mounted onto a fiber-winding machine 150 where continuous filaments of dry fibers 125 are pulled from a plurality of spools (not shown) and routed through an alignment device 160 to be wrapped around the metal pipe 110. The metal pipe 110 may be secured at both ends 140 and rotated via the fiber-winding machine 150 as the dry fibers 125 are wrapped around the metal pipe 110 from one end to the other and back again, continuing in a hoop-winding fashion until the dry fibers 125 have been applied to the desired thickness to form a dry fiber layer 120.

Figure 4:
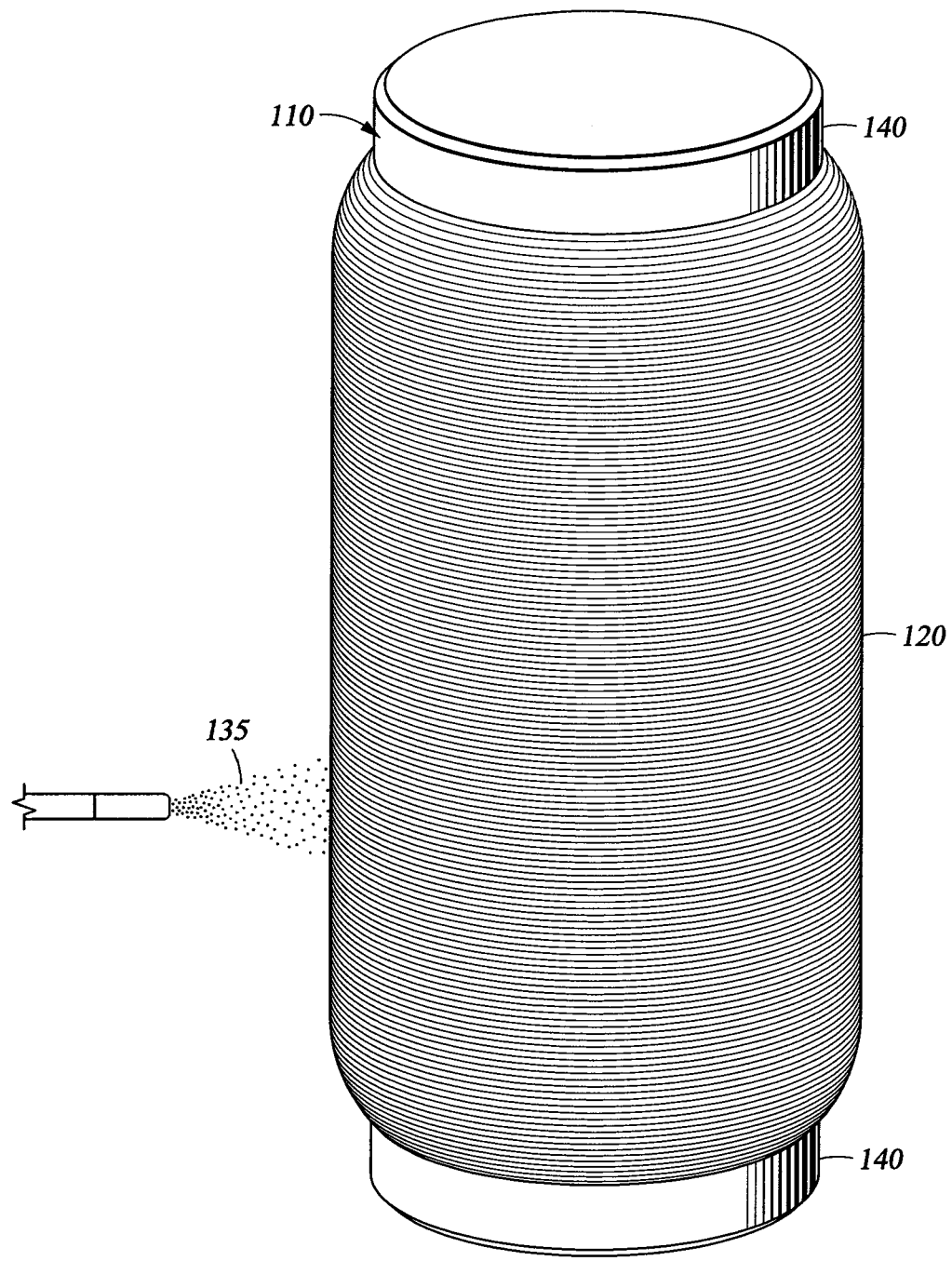
FIG. 4 is a perspective side view of the dry fiber wrapped pipe section of FIG. 3 as it is being sprayed with a coating that forms an external elastomeric liner.

Referring now to FIG. 4, after the metal pipe 110 has been wrapped with a dry fiber layer 120 to a desired thickness, the fiber-wrapped metal pipe 110 is then removed from the fiber-winding machine 150, and the ends 140 of the metal pipe 110 may be taped or otherwise covered so that a coating 135 may be sprayed on over the dry fiber layer 120 using a paint gun or other device, whether automated or hand-held. Covering the ends 140 of the metal pipe 110 prevents application of the coating 135 to these surfaces, which will ultimately be the weld area during pipeline installation. In an embodiment, the sprayed-on coating 135 dries to form an external elastomeric liner 130 at room temperature and requires no curing. Once this external elastomeric liner 130 is dry, the tape or other covering may be removed from the ends 140 of the metal pipe 110.

In other embodiments, the external liner 130 is applied over the dry fiber layer 120 before removing the metal pipe 110 from the fiber-winding machine 150. In one embodiment, the external liner 130 is applied by wrapping an uncured HNBR rubber tape or equivalent around the dry fiber layer 120, which is then cured by heating. In another embodiment, the external liner 130 is applied by spiral welding a metal sheet wrapped around the dry fiber layer 120. Then the reinforced pipe section 100 is ready for transport to the installation site.

Figure 5:
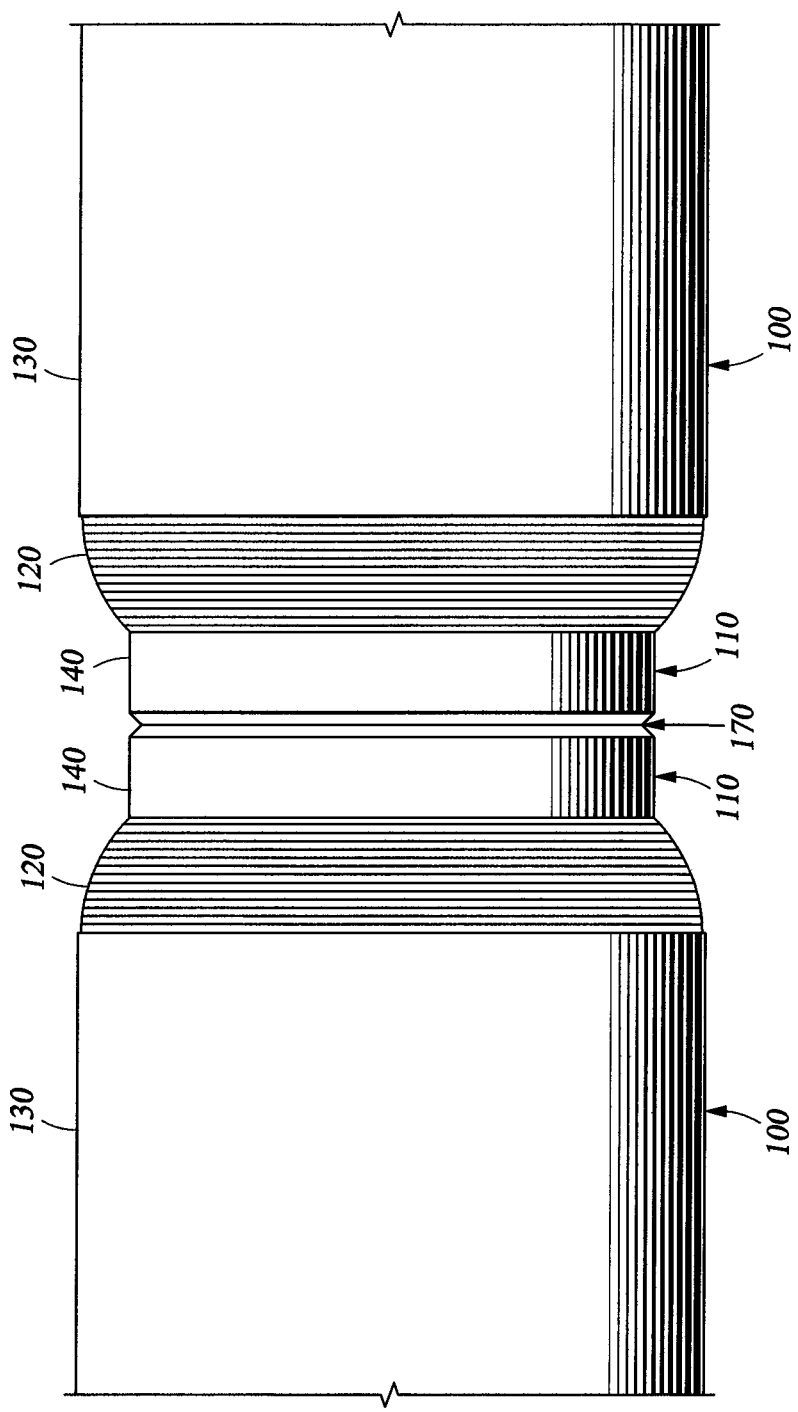
FIG. 5 is an enlarged side view of two dry fiber wrapped pipe sections, each wrapped and sprayed as depicted in FIGS. 3 and 4, prior to being welded together.
Figure 6:
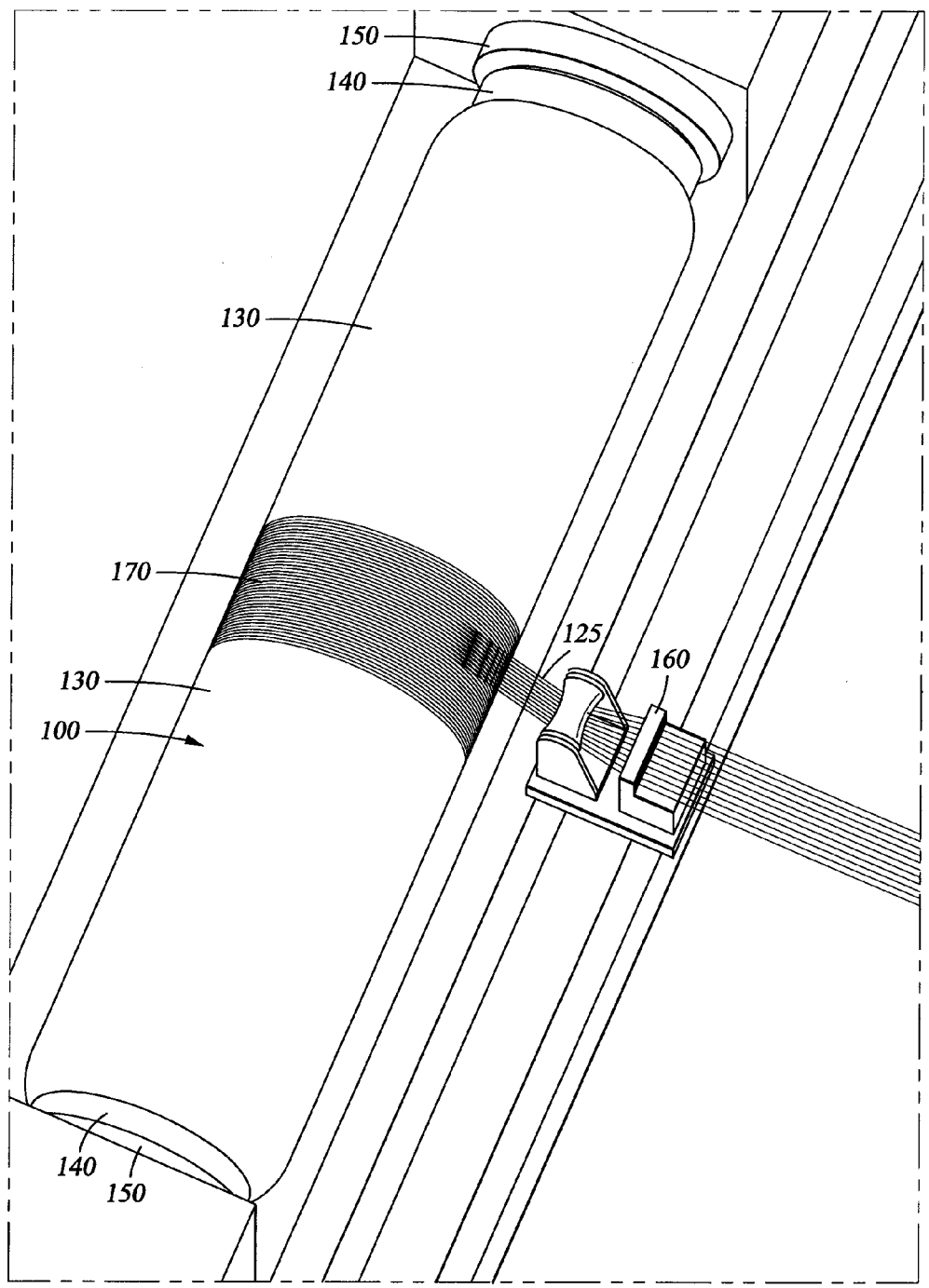
FIG. 6 is a perspective side view of the two pipe sections shown in FIG. 5 welded together, with the weld area being wrapped with dry fiberglass fibers.
Figure 7:
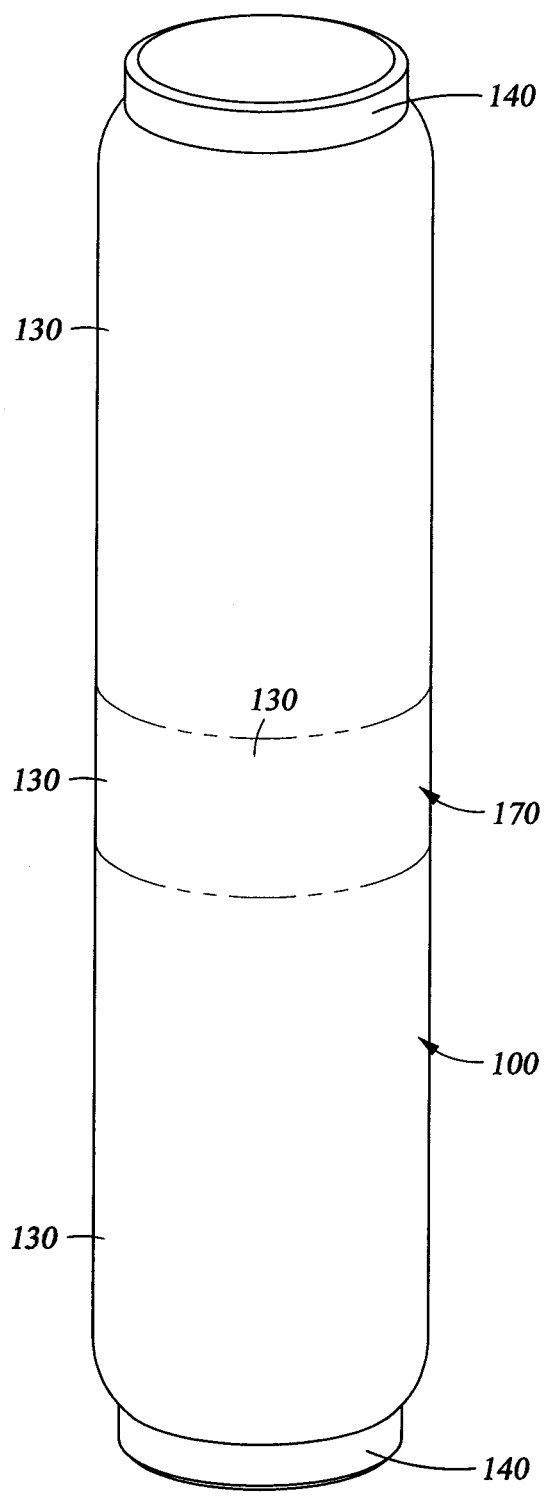
FIG. 7 is a perspective side view of the welded pipes of FIG. 6 after the weld area has been wrapped with dry fibers and then sprayed with a coating that forms an external elastomeric liner.

Upon arrival at the installation site, two reinforced pipe sections 100 may be positioned end 140 to end 140 for welding as shown in FIG. 5. After the welding is completed, each weld area 170 may be wrapped with a layer of dry fiber 120 to reinforce the weld, as shown in FIG. 6, and then sprayed with a coating 135 that dries to form the external elastomeric liner 130 around the weld area 170, as shown in FIG. 7. FIG. 6 depicts the weld area 170 being wrapped with dry fibers 125 by a fiber-winding machine 150 in a shop, but the weld area 170 may also be field-wrapped using a special winding machine that rotates around the welded reinforced pipe sections 100, which remain stationary. This type of field-winding machine is commonly used for fabricating a continuous and spoolable composite pipe.

The use of the reinforced pipe sections 100 described herein offers many advantages as compared to alternatives such as high strength steel pipe and composite wrapped steel pipe. A metal pipe 110 comprising conventional strength steel is available from many suppliers worldwide, unlike high strength steel pipe, which is manufactured by only a handful of steel mills, resulting in high purchase prices and delivery times of up to several years. Conventional strength steel is also self-arresting to prevent the running of cracks and eliminate the need for crack arrestors, unlike high strength steel. The dry fiber layer 120 of the reinforced pipe section 100 allows for higher internal pressures with a thinner pipe wall of the metal pipe 110, thereby reducing weight and transportation cost because the density of the dry fiber is less than ⅓ the density of steel. Furthermore, the layer of dry fiber 120 acts as a thermal insulator, reducing the cost of heating or cooling requirements. Moreover, using a thinner pipe wall reduces the cost of welding and fabrication.

The reinforced pipe section 100 disclosed herein is also advantageous over composite wrapped steel pipe because it does not require the application of a resin nor subsequent curing during fabrication, which also reduces time and expense. In addition, field welding the reinforced pipe section 100 is far less complicated than field welding composite wrapped pipe because the high temperature limitation for dry fibers 125 exceeds 600° C., whereas the high temperature limitation for the composite material is approximately 150° C. Further, the layer of dry fibers 120 is far lighter than a composite material, so transportation costs are lower.

The reinforced pipe section 100 disclosed herein is also cost effective when the metal pipe 110 comprises a corrosion resistant alloy since only half of the wall thickness is required to achieve the same pressure rating by using an overwrap of dry fibers 125, which are far lighter and less expensive than corrosion resistant alloys. For example, fiberglass fibers have a strength of more than four times that of duplex stainless steel, a density of less than 1/3 of duplex stainless steel, and a cost of approximately 1/10$^{th}$ that of duplex stainless steel.

EXAMPLES

Various tests were conducted to demonstrate the feasibility of using conventional strength steel pipe wrapped with dry fibers as an alternative to high strength steel or composite wrapped steel in high-pressure applications.

One section of 12-inch nominal diameter X70 pipe having a wall thickness of 0.25 inches was hoop-wound with 0.35 inches of dry fiberglass and then sprayed with a 0.1 inch layer of polyurea, which dried to form an elastomeric liner. An internal pressure of 4,500 psi was applied to the pipe section for approximately 5 minutes and then released. The internal pressure was then increased to failure, which occurred at approximately 7,800 psi at a girth weld.

This test indicates that the layer of dry fiberglass significantly increased the pressure rating of the X70 pipe and also changed the failure mode from hoop (burst) to axial failure. Without the fiberglass wrap, the 12-inch X70 pipe with a wall thickness of 0.25 inches should have failed by burst pressure at approximately 3,900 psi, which is the pressure at which the axial stress in the X70 pipe was expected to have reached the ultimate tensile strength of the X70 steel, which is 93,600 psi. Therefore, the 0.35 inch thick layer of dry fiberglass approximately doubled the pressure rating of the X70 pipe.

As a point of comparison, this test was repeated with another section of 12-inch nominal diameter X70 pipe having a wall thickness of 0.25 inches, but instead of being wrapped with dry fibers, this pipe section was hoop-wound with a composite laminate comprising fiberglass in an epoxy resin, and then the section was placed in a furnace to cure the composite. An internal pressure of 4,500 psi was applied to the pipe section for approximately 5 minutes and then released. Then, internal pressure was increased to failure, which occurred at approximately 7,400 psi at a girth weld. This test indicates that the dry fibers are at least as effective as the composite overwrap in terms of increasing the pressure rating of the X70 pipe.

To test the strength of a field-wrapped weld area, two sections of 12-inch nominal diameter X70 pipe, each approximately 2 feet long and each having a 0.25 inch wall thickness, were pre-wrapped with 0.35 inches of dry fiberglass and sprayed with a 0.1 inch layer of polyurea, leaving an exposed weld area of approximately 3-inches at one end of each pipe section.

Figure 8:
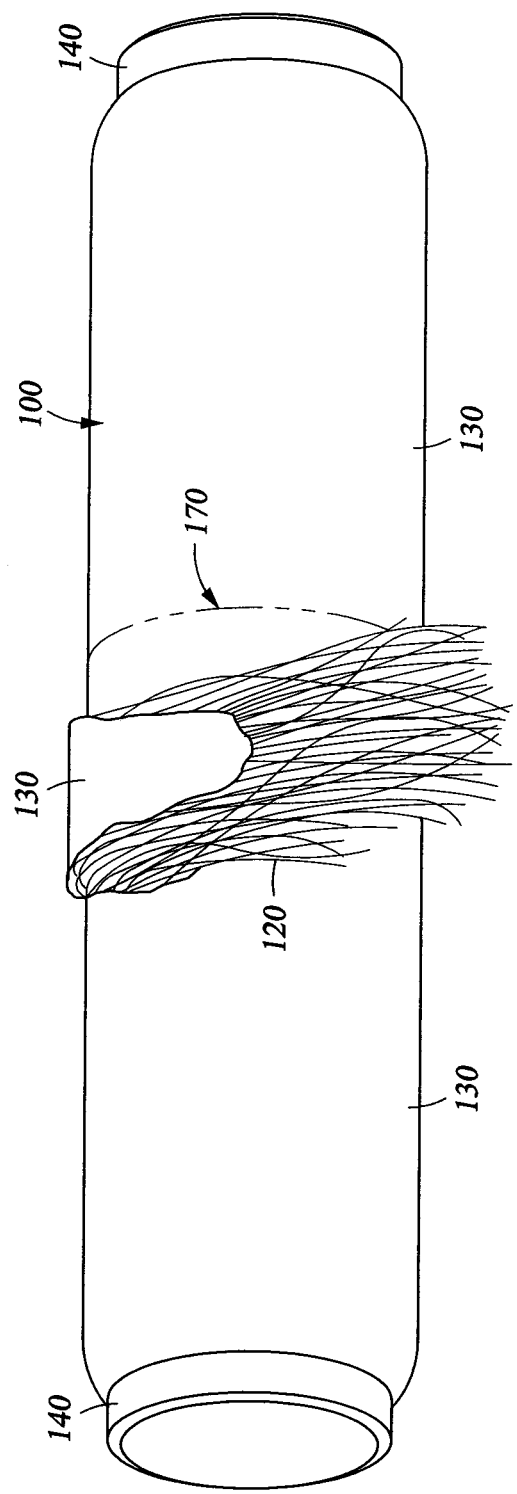
FIG. 8 is a perspective side view of the welded pipes of FIG. 7 after being tested to a failure pressure of approximately twice the failure pressure of the welded pipes without the dry fiber overwrap.

The two pipe sections were then welded together, and the exposed weld area was wrapped with approximately 0.35 inches of dry fiberglass and sprayed with a 0.1 inch layer of polyurea to form an elastomeric liner over the weld as shown in FIG. 7. End caps were welded to the other end of each pipe section. An internal pressure of 4,500 psi was applied to the two welded pipe sections for approximately 5 minutes and then released. Then, internal pressure was increased to failure, which occurred at approximately 7,800 psi at the girth weld between the pipe sections. However, the failure was not catastrophic. Instead, as shown in FIG. 8, the damage was localized to the area of the girth weld 170, where a section of the dry fiber layer 120 expanded and tore apart, thereby creating a small rip in the external liner 130 and exposing the torn dry fibers 120. This test indicates that field-wrapped weld areas are just as effective as pre-wrapped pipe sections in terms of increasing the pressure rating of the X70 pipe.

While various embodiments of the reinforced pipe section comprising a dry fiber wrapped metal pipe and corresponding methods of manufacturing such reinforced pipe sections have been shown and described, modifications thereof can be made by one skilled in the art without departing from the spirit or teaching of this invention. The embodiments described herein are representative only and are not limiting. Many variations and modifications of the apparatus and methods are possible and are within the scope of the invention. Accordingly, the scope of protection is not limited to the embodiments described herein, but is only limited by the claims that follow, the scope of which shall include all equivalents of the subject matter of the claims.

I claim:

1. A method of manufacturing a reinforced pipe sections comprising:
   wrapping a layer of dry fibers by hoop winding a plurality of dry fibers around first and second metal pipes in a manufacturing facility;
   covering the layer of dry fibers on each metal pipe with an external liner without the application of a resin and without subsequent curing during fabrication thereby forming dry fiber reinforced metal pipes in a manufacturing facility;
   positioning the second dry fiber reinforced metal pipe adjacent to the first dry fiber reinforced metal pipe at a field location;
   connecting the second dry fiber reinforced metal pipe to the first dry fiber reinforced metal pipe via a weld at a field location;
   wrapping the weld by hoop winding a layer of dry fibers onto the weld area at a field location; and
   creating an external liner over the layer of dry fibers disposed around the weld without the application of a resin and without subsequent curing during fabrication, thereby forming a dry fiber reinforced weld area in a field location.

2. The method of claim 1 wherein the layer of dry fibers increases the hoop strength of each metal pipe.

3. The method of claim 1 wherein each metal pipe comprises a corrosion resistant alloy.

4. The method of claim 1 wherein the layer of dry fibers arrests a crack that may develop in the first or second metal pipe during service.

5. The method of claim 1 wherein each metal pipe comprises bare pipe.

6. The method of claim 1 wherein each metal pipe comprises coated pipe.

7. The method of claim 1 wherein each metal pipe is pre-coated with an organic coating.

8. The method of claim 1 wherein each metal pipe is pre-coated with an anodic metallic coating.

9. The method of claim 1 wherein each metal pipe is corrosion protected.

10. The method of claim 1 wherein an aluminum anode strip is wound onto each metal pipe.

11. The method of claim 1 wherein a pH spiking salt is applied to the layer of dry fibers.

12. The method of claim 1 wherein the first or second metal pipe comprises a degraded pipe.

13. The method of claim 1 wherein the dry fibers are selected from the group consisting of: glass fibers, carbon fibers, high density polyethylene fibers, or amid fibers.

14. The method of claim 1 wherein the layer of dry fibers comprises a ribbon of multiple parallel strands with each strand consisting of many continuous filaments.

15. The method of claim 1 wherein the external liner comprises an elastomeric liner.

16. The method of claim 15 wherein the elastomeric liner is selected from the group consisting of: polyurea, polyurethane, or HNBR rubber.

17. The method of claim 1 wherein the external liner comprises a welded metal wrapping formed around the dry fibers.

18. The method of claim 1 wherein the external liner forms a moisture barrier.

19. The method of claim 1 wherein each metal pipe comprises a wall thickness sufficient to withstand the axial loads imposed during service.

20. The method of claim 19 wherein the layer of dry fibers has a thickness substantially equal to the wall thickness of the metal pipe.

21. The method of claim 20 wherein the layer of dry fibers approximately doubles the hoop strength of the metal pipe.

22. The method of claim 1 wherein each metal pipe has a nominal diameter in the range of 64-inches or less.

23. The method of claim 1 wherein covering the layer of dry fibers with an external liner comprises wrapping on a liner.

* * * * *